(12) United States Patent
Takano et al.

(10) Patent No.: US 8,711,543 B2
(45) Date of Patent: Apr. 29, 2014

(54) ELECTRIFYING ROLLER

(75) Inventors: Junichi Takano, Yokohama (JP);
Hirotaka Tagawa, Yokohama (JP);
Izumi Egashira, Yokohama (JP);
Daijirou Sirakura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 469 days.

(21) Appl. No.: 13/059,853

(22) PCT Filed: Aug. 24, 2009

(86) PCT No.: PCT/JP2009/064742
§ 371 (c)(1),
(2), (4) Date: May 12, 2011

(87) PCT Pub. No.: WO2010/021403
PCT Pub. Date: Feb. 25, 2010

(65) Prior Publication Data
US 2011/0249372 A1    Oct. 13, 2011

(30) Foreign Application Priority Data

Aug. 22, 2008 (JP) ................... 2008-214683

(51) Int. Cl.
*H05F 3/00* (2006.01)
(52) U.S. Cl.
USPC ........................................... 361/225
(58) Field of Classification Search
USPC ........................................... 361/225
See application file for complete search history.

(56) References Cited

U.S. PATENT DOCUMENTS

| | | | |
|---|---|---|---|
| 8,376,922 B2 * | 2/2013 | Akama et al. | 492/56 |
| 2007/0197362 A1 | 8/2007 | Sakata et al. | |
| 2008/0220179 A1 | 9/2008 | Akama et al. | |

FOREIGN PATENT DOCUMENTS

| | | |
|---|---|---|
| CN | 101048708 A | 10/2007 |
| CN | 1011788559 A | 5/2008 |
| JP | 07-20684 A | 1/1995 |
| JP | 2002-310136 A | 10/2002 |
| JP | 2006-184895 A | 7/2006 |
| JP | 2007-121445 A | 5/2007 |
| JP | 2007-232861 A | 9/2007 |
| JP | 2007-233367 A | 9/2007 |
| JP | 2007-248945 A | 9/2007 |
| JP | 2007-293107 A | 11/2007 |
| JP | 2008-165214 A | 7/2008 |
| JP | 2008-239833 A | 9/2008 |
| WO | 2005/121906 A1 | 12/2005 |

OTHER PUBLICATIONS

Japanese Office Action dated Nov. 27, 2012, issued in corresponding Japanese Patent Application No. 2010-525729.
First Office Action issued Jun. 26, 2012 in Chinese Patent Application No. 200980132860.8 to Bridgestone Corp. with partial English translation.

* cited by examiner

*Primary Examiner* — Stephen W Jackson
(74) *Attorney, Agent, or Firm* — Sughrue Mion, PLLC

(57) ABSTRACT

Provided is an electrifying roller which may be used in a contact electrification method, which may be manufactured more easily, and which may better prevent problems caused by an electrically conductive material.

3 Claims, 1 Drawing Sheet

ELECTRIFYING ROLLER

CROSS REFERENCE TO RELATED APPLICATIONS

This application is a National Stage of International Application No. PCT/JP2009/064742, filed on Aug. 24, 2009, which claims priority from Japanese Patent Application No. 2008-214683 filed Aug. 22, 2008, the contents of all of which are incorporated herein by reference in their entirety.

TECHNICAL FIELD

The present invention relates to an electrifying roller (hereinafter, also simply referred to as "roller"), and more particularly, to an electrifying roller which may be used in a contact electrification method, which may be manufactured more easily, and which may better prevent problems caused by an electrically conductive material.

BACKGROUND ART

Generally, in an electrophotography image forming apparatus such as a copier, a printer, a facsimile or the like, a roller which is provided with electrical conductivity such as a transfer roller, a developing roller, a toner supplying roller, an electrifying roller, a cleaning roller, an intermediate transfer roller, a belt driving roller or the like is employed for each process of the image forming apparatuses.

As such a conductive roller, an electrifying roller or the like has been known which is formed by providing an electrically conductive shaft made of metal or polymer with an elastic layer made of foamed or non-foamed rubber, and providing thereon one or more skin layers. For example, in the Patent Document 1, disclosed is an electrifying roller which has a resistivity adjusting layer made of urethane resin or the like and a surface skin layer. In the Patent Document 2, disclosed is a foam roller formed by coating an ultraviolet curing resin on the surface of an elastic layer made of a foam layer or made of a foam layer and a skin layer. Further, in the Patent Document 3, disclosed is an electrically conductive roller which has a non-foamed rubber elastic layer and a skin layer made of polysiloxane. Still further, in the Patent Document 4, disclosed is an electrically conductive roller which has an elastic layer made of elastomer and a resin coating layer comprising an ultraviolet curing resin.

In the Patent Document 5, disclosed is a developing roller in which a resin layer made of an ultraviolet curing resin is provided on an electrically conductive shaft.

Further, it is known that an ultraviolet curing resin is used as an elastic layer of an electrically conductive layer. For example, in the Patent Document 6, disclosed is a method of coating an ultraviolet curing resin by a die coater.

RELATED ART DOCUMENT

Patent Document

Patent Document 1: Japanese Unexamined Patent Application Publication No. 2007-121445
Patent Document 2: Japanese Unexamined Patent Application Publication No. 2002-310136
Patent Document 3: Japanese Unexamined Patent Application Publication No. 2007-232861
Patent Document 4: Japanese Unexamined Patent Application Publication No. 2008-165214
Patent Document 5: WO 2005/121906
Patent Document 6: Japanese Unexamined Patent Application Publication No. 2006-184895

SUMMARY OF THE INVENTION

Problems to be Solved by the Invention

However, since, in the conventional electrically conductive rollers described in the Patent Documents 1 to 4, the elastic layers are made of foamed rubber or non-foamed rubber, a molding process, a preheating process, a casting process, a heat curing process, a cooling process, and a solid layer (resistivity adjusting layer or the like) manufacturing process are required. For example, in the paragraph [0015] and the like in the Patent Document 2, as a method of forming an elastic layer by foamed rubber, an in-mold foaming method by a two-component rubber is disclosed; and in the paragraphs [0012] to [0014] and the like in the Patent Document 3, as a method of forming an elastic layer by non-foamed rubber, a method in which a rubber tube is injection molded and a core bar is inserted thereinto, and a method in which a rubber layer is provided by extrusion on a core bar followed by being ground by a grindstone are disclosed. Therefore, in the methods described in the Patent Documents 1 to 4, in order to form an elastic layer, an equipment for an exclusive use and a long time for curing or the like are required, and the improvement thereof is desired.

In an electrifying roller used in a contact electrification method, an elastic layer is required to be provided in order to have an elasticity to be able to withstand the contact on a photoreceptor. However, in a method described in the Patent Document 5, an elastic layer is formed by a method in which an ultraviolet curing resin is provided as a resin layer on a hollow cylinder, but there is a problem in that the diameter of the cylinder becomes too large because the cylinder is hollow.

Further, in cases where a compound comprising an ultraviolet curing resin is further laminated on an elastic layer as in a method described in the Patent Document 6, an extra improvement is required with respect to the effect by an electrically conductive material such as decrease in transparency by an electrically conductive material such as carbon black, or bleed out of a low-molecular electrically conductive material.

Accordingly, an object of the present invention is to overcome the above-mentioned problems and to provide an electrifying roller which may be used in a contact electrification method, which may be manufactured more easily, and which may better prevent problems caused by an electrically conductive material.

Means for Solving the Problems

To solve the above-mentioned problems, the present inventors intensively studied to discover that an electrifying roller which may be used in a contact electrification method, which may be manufactured more easily, and which may better prevent problems caused by an electrically conductive material can be obtained by employing an ultraviolet curing resin as an elastic layer, and by laminating a compound which does not comprise an ultraviolet curing resin on the elastic layer, thereby completing the present invention.

That is, the electrifying roller of the present invention is
an electrifying roller which has a shaft, an elastic layer formed on the periphery of the shaft, and a surface layer formed on the periphery surface of the elastic layer, wherein
said elastic layer is formed by an ultraviolet curing resin, and
said surface layer is formed by a heat curing resin.

In the electrifying roller of the present invention, it is preferred that the thickness of said elastic layer be 0.9 to 1.3 mm and that said shaft be a hollow cylinder or solid cylinder made of metal.

Effects of the Invention

By the present invention, an electrifying roller which may be used in a contact electrification method, which may be manufactured more easily, and which may better prevent problems caused by an electrically conductive material can be provided.

MODES FOR CARRYING OUT THE INVENTION

Preferred embodiments of the present invention will now be described in detail with reference to the figures.

Figure 1:
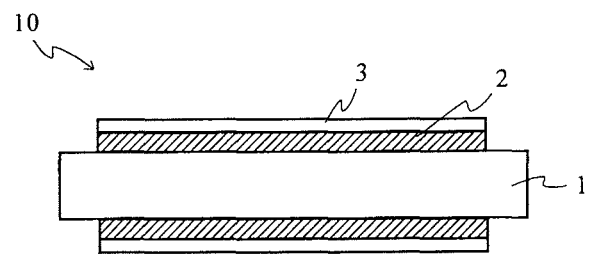
FIG. 1 is a drawing illustrating one example of preferred embodiments of an electrifying roller of the present invention.

FIG. 1 is a drawing illustrating one example of preferred embodiments of an electrifying roller of the present invention. An electrifying roller 10 of the present invention has a shaft 1, an elastic layer 2 formed on the periphery of the shaft 1, and a surface layer 3 formed on the periphery surface of the elastic layer 2.

In the present invention, it is important that the elastic layer 2 be formed by an ultraviolet curing resin, and the surface layer 3 be formed by a heat curing resin. By making the ultraviolet curing resin have an elasticity which is required for an electrifying roller, an electrifying roller can be formed without providing an elastic layer by a conventional rubber. If the ultraviolet curing resin is employed for the surface layer, in cases where carbon black was added as the electrically conductive material, it was feared that curing was not enough since carbon black absorbs ultraviolet because carbon black is black, however, by using the heat curing resin, it became possible that curing can be performed sufficiently regardless of the type of electrically conductive materials.

In the present invention, it is preferred that the ultraviolet curing resin be an ultraviolet curing resin which has the following characteristics (1) to (4):
(1) good adhesion to the shaft 1,
(2) a volume specific resistivity of $10^6$ to $10^8$ Ω·cm
(3) flexible and large breaking strength, and
(4) no bleed out of low-molecular electrically conductive material, although not restricted thereto as long as an intended effect of the present invention can be obtained. Thus, both characteristics of a foam elastic layer and a solid skin layer of the conventional electrifying roller can be attained in combination.

Examples of the above-mentioned ultraviolet curing resin include polyester resin, polyether resin, fluororesins, epoxy resin, amino resin, polyamide resin, acrylate resin, acrylic urethane resin, urethane resin, alkyd resin, phenol resin, melamine resin, urea resin, silicone resin, polyvinyl butyral resin, vinyl ether resin, vinyl ester resin, and modified resins into which a particular functionality is introduced thereto, and these resins may be used alone or two or more of these may be mixed to be used. The above-mentioned compound may comprise, other than the below-described electrically conductive material, a reactive diluent as required. The above-mentioned compound is preferred to comprise a photopolymerization initiator and photopolymerization accelerator. The compound may comprise other known additives as required.

As the ultraviolet curing resin, urethane acrylate ultraviolet curing resin composition comprising oligomers having a urethane structure and an ultraviolet polymerization initiator is particularly preferred.

In the present invention, as the electrically conductive materials which may be added to the ultraviolet curing resin of the elastic layer 2, suitable one may be employed. Carbon-based electrically conductive materials such as Ketjen black and acetylene black and carbon blacks for rubber such as SAF, ISAF, HAF, FEF, GPF, FT, MT may be used, and carbon blacks for ink such as oxidized carbon black, thermally decomposed carbon black, graphite, or the like may also be used.

High-polymer ionic electrically conductive materials may be added as the electrically conductive material, and as such a high-polymer ionic electrically conductive material, for example, those described in Japanese Unexamined Patent Application Publication No. 9-227717, Japanese Unexamined Patent Application Publication No. 10-120924 and Japanese Unexamined Patent Application Publication No. 2000-327922 may be used, but not limited thereto.

Concretely, a mixture of
(A) organic polymer material
(B) ion conducting polymer or copolymer and
(C) inorganic or low-molecular weight organic salts can be exemplified. Examples of component (A) include polyacrylic ester, polymethacrylic ester, polyacrylonitrile, polyvinyl alcohol, polyvinyl acetate, polyamide, polyurethane or polyester; examples of component (B) include oligoethoxylated acrylate or mathacrylate, oligoethoxylated styrene at the aromatic ring, polyether urethane, polyether urea, polyether amide, polyether ester amide or polyether ester; and examples of component (C) include alkaline metal, alkaline earth metal, zinc or ammonia salt of inorganic or low-molecular organic protonic acids, and component (C) is preferably $LiClO_4$, $LiCF_3SO_3$, $NaClO_4$, $LiBF_4$, $NaBF_4$, $KBF_4$, $NaCF_4SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$, $Ca(CF_3SO_3)_2$ or the like.

In the present invention, a method of forming the above-mentioned elastic layer 2 is not particularly restricted, and usually a method is employed in which a coating solution in which the above-mentioned ultraviolet curing resin component, an electrically conductive material and the like are dispersed or dissolved is prepared and this coating solution is applied on the above-mentioned shaft 1 by dipping method, spray method, roll coater method, die coat method or the like to be solidified by drying. In particular, a dipping method is preferably used. Simplification of manufacturing process is possible by directly applying the ultraviolet curing resin on the shaft 1.

The thickness of the elastic layer 2 of the electrifying roller 10 of the present invention is preferably 0.9 to 1.3 mm. A spark discharge can be prevented by setting the thickness of the elastic layer 2 in the above range. If the thickness of the elastic layer 2 is less than 0.9 mm, in a high temperature and low humidity area represented by Central America or the like, it is feared that a spark discharge occurs from a core bar (shaft) to a photoreceptor, which is not preferable. On the other hand, if the thickness of the elastic layer 2 is more than 1.3 mm, it becomes significantly difficult to control the external diameter of the roller during dipping application, which is not preferable since difference between the right side and the left side is likely to occur. If the difference between the external diameters of the roller at the right side and the left side is too large, adhesion of the electrifying roller to the photoreceptor becomes ununiform, and particularly adhesion of the electrifying roller to the photoreceptor at the side at which the external diameter is smaller becomes insufficient and charging ability cannot be fully exerted, therefore, it is feared that a problem of black patches occurs during an image evaluation.

In the present invention, as the shaft 1, those which are made of metal or plastic and in a hollow cylinder or solid cylinder shape may be used, and preferably, the shaft 1 is a hollow cylinder or solid cylinder made of metal, and more preferably, the shaft 1 is a hollow cylinder made of metal. By this, the cost can be reduced.

In the present invention, as the heat curing resin which forms the surface layer 3, known rubbers or resins used when the surface of an electrifying member is formed may be used, and although not limited thereto, urethane modified acrylic resins, polyurethane resins, acrylic resins, polyamide resins and fluororesins are exemplified and one or more of these may be mixed to be used. Among these, fluororesins are preferably used from the viewpoint that the surface of an electrifying roller can be provided with anti-toner adhesiveness.

As the fluororesins, concretely, polytetrafluoroethylene, tetrafluoroethylene perfluoro alkyl vinyl ether copolymer, tetrafluoroethylene ethylene copolymer, polychlorotrifluoroethylene resin, chlorotrifluoroethylene ethylene copolymer, tetrafluoroethylene vinylidene fluoride copolymer, poly vinylidene fluoride, polyvinyl fluoride and the like are exemplified.

In the resin which forms this surface layer 3, although not restricted thereto, an electrically conductive material may be added to provide or adjust the electric conductivity (electric resistance) on the surface layer. In this case, as the electric conductive material, although not restricted thereto, a variety of electric electrically conductive material or ionic electrically conductive material may be used, and particularly carbon is preferably used in the present invention.

The amount of the electrically conductive material added can be adjusted as appropriate so that a desired resistance is obtained. In this case, the volume specific resistivity of the surface layer 3 is preferably $1 \times 10^4$ to $1 \times 10^{12}$ Ω·cm, particularly $1 \times 10^6$ to $1 \times 10^8$ Ω·cm, and the amount of the electrically conductive material added can be adjusted so that such a volume specific resistivity is attained. When carbon is employed as the electrically conductive material, the amount of the electrically conductive material added is usually about 1 to 100 phr, and particularly about 10 to 70 phr based on a base resin.

To the resin composition which forms this surface layer 3, an additive such as cross linking agent, thickener, thixotropic agent or structural viscosity agent may be added as required.

The method of forming the above-mentioned layer 3 is not particularly limited, and usually a method in which a coating solution in which the above-mentioned resins, electrically conductive materials and the like are dispersed or dissolved is prepared and this coating solution is applied by dipping method, spray method, roll coater method or the like to be subjected to heat curing is generally employed. The solvent for preparing the coating solution may be suitably selected depending on the type of base resin which constitutes the resin composition or the like. For example, when fluororesin is employed as the base resin, methyl ethyl ketone (MEK), methyl isobutyl ketone (MIBK), toluene, xylene or the like may be preferably employed.

The thickness of the surface layer 3 is set depending on the shape of the electrifying roller 10 or the like, and not particularly restricted thereto, and may be set usually 1 to 30 μm, particularly 1 to 20 μm. If the thickness is smaller than 1 μm, the durability of the roller is sometimes poor, and on the other hand, if the thickness is larger than 20 μm, there are cases where a good surface quality may not be obtained such as a case where charging characteristics is negatively affected and a case where wrinkle occurs on the surface.

Figure 2:
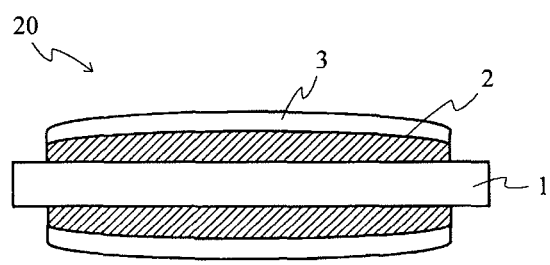
FIG. 2 is a drawing illustrating another example of preferred embodiments of an electrifying roller of the present invention.

FIG. 2 is a drawing illustrating another example of preferred embodiments of an electrifying roller of the present invention. Since it is important that a uniform working face be formed in the longitudinal direction when pressed on the photoconductor drum, the electrifying roller 20 has a crown shape whose diameter at the center portion is larger than those at the end portions.

As a crown amount which represents the degree of the protrusion in which the portion at the center is more protruded than the portions at the ends in the roller length direction in the cross section of the roller length direction, 50 to 300 μm is preferably employed. By employing this amount, normal images may be made more preferable. If the crown amount is smaller than 50 μm, the contact pressure at the center of the roller in the roller length direction becomes low, while if the crown amount is larger than 300 μm, the portion at the center of the roller in the roller length direction makes too strong contact. Both cases possibly cause ununiformity of the charge amount. The measurement of the crown amount of the electrifying roller of the present invention was performed by using High Precision Laser Measuring Machine LSM-430v manufactured by Mitutoyo Co., Ltd. External diameters at the center portion and at 90 mm from the center portion in the direction from the center portion to the end portion were measured by this measuring machine, and a roller crown amount is defined as the difference between the external diameter at the center portion and the average of the external diameters at 90 mm from the center portion in the directions from the center portion to the end portions. For example, for an electrifying roller having a roller length of 250 mm, external diameters are measured at three point, at 35 mm, 125 mm and 215 mm from one end of the roller. In this case, the crown amount (μm) is calculated by the following formula (1):

$$\text{crown amount}(\mu m) = \{B - (A+C)/2\} \times 1000 \quad (1),$$

where the external diameter at 35 mm from one end of the roller is A (mm), the external diameter at 125 mm from one end of the roller is B (mm) and the external diameter at 215 mm from one end of the roller is C (mm).

In the present invention, the electrifying rollers 10 and 20 preferably have a deviation (precision of film thickness) of not larger than 70 μm in the whole range in the roller length direction. The electrifying rollers 10 and 20, and the photoreceptor are revolving while being in contact with each other, and when the deviation of the electrifying rollers 10 and 20 is large, a gap between the electrifying rollers 10 and 20, and the photoreceptor is generated. Further, the gap distance varies. In this case, toner particle and external additives which remain on the photoreceptor are likely to intrude into the gap and then attached irregularly on the electrifying rollers 10 and 20. As a result, the surface of the roller becomes mottled with the remain, which produces an image with a low quality. It is noted that the measurement of the deviation of the electrifying rollers 10 and 20 of the present invention was performed by using High Precision Laser Measuring Machine LSM-430v manufactured by Mitutoyo Co., Ltd. The external diameters for five points in the roller length direction were measured by this measuring machine, and a deviation was defined as the average of the difference between the maximum value and the minimum value of the measured external diameter for each point.

In the manufacturing method of the electrifying rollers 10 and 20, a coating incorporating an ultraviolet curing resin is applied on the shaft 1, and subjected to ultraviolet (UV) to form the elastic layer 2. Then, a coating solution of the surface layer 3 is applied on the elastic layer 2, followed by heat curing. For example, in the case where water-based coating is employed, the curing temperature, at this process, may be set about 105° C. or higher which is a temperature higher than the boiling temperature of the solvent. By forming the elastic layer by an ultraviolet curing resin, the manufacturing process and manufacturing time may be shortened.

In the present invention, the irradiation intensity and integrated light intensity of the ultraviolet (UV) for curing an ultraviolet curing resin are not limited as long as the ultraviolet curing resin can be cured sufficiently. For example, the ultraviolet is irradiated at an irradiation intensity of 100 to 700 W/cm$^2$ and an integrated light intensity of 200 to 3000 mJ/cm$^2$.

EXAMPLES

The present invention will be described more concretely by way of examples.

Examples 1 to 4

A coating liquid which has a formulation shown in the Table 1 below was applied on the surface of the metal shaft member 1 in a hollow cylinder shape (material: aluminum A6063, length: 230 mm, thickness: 0.7 mm, external diameter φ: 18 mm) by a die coater, irradiated at an UV irradiation intensity of 1500 W/cm$^2$ for 5 seconds, whereby each of elastic layers made of an ultraviolet curing resin having a thickness as shown in the Table 1 below was obtained. The film thickness (mm) and volume specific resistivity (Ω·cm) of the obtained elastic layer made of the ultraviolet curing resin were measured.

<Measurement of Volume Specific Resistivity>

A volume specific resistivity (Ω·cm) at a measuring voltage of 250 V was measured at a temperature of 23° C. and at a relative humidity of 50% by using, as a measuring apparatus, Hiresta-UP (manufactured by Mitsubishi Chemical Corporation) to which a UR probe is connected.

TABLE 1

|  |  |  | Example 1 | Example 2 | Example 3 | Example 4 |
|---|---|---|---|---|---|---|
| Added Component (parts by mass) | Oligomer | Urethane oligomer A*[1] | 60 | — | — | — |
|  |  | Urethane oligomer B*[2] | — | 100 | — | — |
|  |  | Urethane oligomer C*[3] | — | — | 60 | 80 |
|  | Monomer | MTG-A*[4] | 20 | — | 60 | 20 |
|  |  | 14EG-A*[5] | 10 | — | — | — |
|  |  | ASA*[6] | 10 | — | — | — |
|  |  | DPM-A*[7] | — | — | 20 | — |
|  | Electric conductive material | Sankonol MTG-A-50R*[8] | 5 | 0.5 | 0.3 | 0.5 |
|  | Initiator | IRGACURE184*[9] | 0.5 | 0.5 | 0.5 | 0.5 |
| Evaluation |  | Film thickness (mm) | 1.00 | 1.04 | 0.93 | 1.25 |
|  |  | Volume specific resistivity (Ω·cm) | $4.57 \times 10^6$ | $6.98 \times 10^7$ | $1.80 \times 10^6$ | $1.59 \times 10^6$ |

*[1]Trade name: Urethane oligomer A manufactured by Dai-ichi Kogyo Seiyaku Co., Ltd.
*[2]Trade name: Urethane oligomer B manufactured by Dai-ichi Kogyo Seiyaku Co., Ltd.
*[3]Trade name: Urethane oligomer C manufactured by Dai-ichi Kogyo Seiyaku Co., Ltd.
*[4]Trade name: MTG-A manufactured by KYOEISHA CHEMICAL Co., LTD.
*[5]Trade name: 14EG-A manufactured by Shin-Nakamura Chemical Co., LTD.
*[6]Trade name: ASA, manufactured by Shin-Nakamura Chemical Co., LTD.
*[7]Trade name: DPM-A, manufactured by KYOEISHA CHEMICAL Co., LTD.
*[8]Trade name: Sankonol MTG-A-50R manufactured by Sanko Chemical Ind. Co., Ltd.
*[9]Trade name: IRGACURE 184 manufactured by Ciba Specialty Chemicals KK.

Further, a surface layer 3 (10$^7$ Ω·cm) having a thickness of 5 μm was formed by a dipping method by using a coating solution (for forming a surface layer) in which solution 100 parts by mass of tetrafluoroethylene perfluoro alkyl vinyl ether copolymer as a base resin for the surface layer 3, 30 parts by mass of carbon as an electrically conductive material and 30 parts by mass of PE powder (trade name: SL 3505, manufactured by Elementis PLC) were mixed, and, dissolved and dispersed into a methyl ethyl ketone solvent so that the concentration of the base resin be 10%, to thereby obtaining an electrifying roller as shown FIG. 1.

The electrifying rollers in Examples 1 to 4 had good volume specific resistivities, and neither of them had a problem such as bleed out of the electrically conductive material. Since, in the electrifying rollers in Examples 1 to 4, the elastic layer is formed by an ultraviolet curing resin, the rollers could be manufactured more inexpensively and more easily than electrifying rollers in which conventional rubbers or the like are employed for the elastic layer.

Examples 5 to 8

Next, an electrifying roller was manufactured in the same manner as in Example 1 except that the thickness of the elastic layer was changed as shown in the Table 2. For each of the obtained rollers, measurement of the difference between the external diameters of the roller at the right side and the left side and evaluation of the images were performed according to the following description. The results are shown in the Table 2 in combination.

<Measurement of the Difference Between the External Diameters of the Roller at the Right Side and the Left Side>

By using High Precision Laser Measuring Machine LSM-430v manufactured by Mitutoyo Corporation, Ltd., external diameters at 90 mm from the center portion in the direction from the center portion to the end portion were measured, and the difference between the diameters at 90 mm to the end portions was calculated to define the difference (μm) between the external diameters of the roller at the right side and the left side.

<Evaluation of Images>

The obtained electrifying roller was incorporated in a printer Laser jet CP 1210 manufactured by Hewlett-Packard Company and images were evaluated by the uniformity of the concentration of the toner. The evaluation criteria for the image evaluation is shown as follows.

<Evaluation Criteria>

○: No irregularities and uniform in the concentration across the image.

Δ: Black patches exist in a part of the image, and irregularity in the concentration is partly observed.

X: Black patches exist in most part of the image, and irregularity in the concentration is observed in many parts.

TABLE 2

|  | Examples 5 | Examples 6 | Examples 7 | Examples 8 |
|---|---|---|---|---|
| Thickness of elastic layer (mm) | 0.9 | 1.1 | 1.3 | 1.5 |
| Difference between the external diameters of the roller at the right side and the left side (μm) | 7 | 8 | 20 | 50 |
| Image evaluation | ○ | ○ | ○ | Δ |

As shown in the above table, it is found that when the thickness of the elastic layer is too high, the difference between the external diameters of the roller at the right side and the left side becomes too large and the quality of the image decreases.

DESCRIPTION OF SYMBOLS

1 shaft
2 elastic layer
3 surface layer
10, 20 electrifying roller

The invention claimed is:

1. An electrifying roller which has a shaft, an elastic layer formed on the periphery of the shaft, and a surface layer formed on the periphery surface of the elastic layer, wherein said elastic layer is formed by an ultraviolet curing resin, and said surface layer is formed by a heat curing resin.

2. The electrifying roller according to claim 1, wherein the thickness of said elastic layer is in the range of 0.9 to 1.3 mm.

3. The electrifying roller according to claim 1, wherein said shaft is a hollow cylinder or solid cylinder made of metal.

* * * * *